United States Patent [19]

Johnson

[11] Patent Number: 5,245,950
[45] Date of Patent: Sep. 21, 1993

[54] POULTRY WATERING SYSTEM

[75] Inventor: William H. Johnson, Harrisonburg, Va.

[73] Assignee: Shenandoah Manufacturing Co., Inc., Harrisonburg, Va.

[21] Appl. No.: 925,207

[22] Filed: Aug. 6, 1992

Related U.S. Application Data

[63] Continuation-in-part of Ser. No. 713,334, Jun. 11, 1991.

[51] Int. Cl.$^5$ .................... A01K 7/06; A01K 39/02
[52] U.S. Cl. ........................ 119/72; 248/74.2
[58] Field of Search ............ 119/75, 72, 72.5, 51.01; 248/74.2, 62, 58

[56] References Cited

U.S. PATENT DOCUMENTS

| | | | |
|---|---|---|---|
| 3,537,430 | 11/1968 | Peppler | 119/72.5 |
| 3,724,425 | 5/1970 | Thompson | 119/72 |
| 4,267,800 | 5/1981 | Keller et al. | 119/72.5 |
| 4,669,422 | 6/1987 | Steudler | 119/72 |
| 4,724,797 | 2/1988 | Steudler | 119/72 |
| 4,794,881 | 1/1989 | Rader | 119/72.5 |
| 4,852,522 | 8/1989 | Uri | 119/72 |
| 4,884,528 | 12/1989 | Steudler | 119/72.5 |
| 4,892,061 | 1/1990 | Steudler | 119/75 |
| 4,944,484 | 7/1990 | Hostetler | 251/101 |
| 5,097,798 | 3/1992 | Little | 119/72 |
| 5,136,982 | 8/1992 | Steudler | 119/72 |

FOREIGN PATENT DOCUMENTS 0277436 8/1988 European Pat. Off. .

Primary Examiner—John G. Weiss
Attorney, Agent, or Firm—Mason, Fenwick & Lawrence

[57] ABSTRACT

A plural nipple poultry watering system assembly combines a structural support, a water tube, plural nipples and catch cups. The watering system is assembled in multiple modules arranged serially in longitudinal alignment to provide watering systems of various lengths. It yields high water flow for maximum growth rate. In addition, the plural nipple poultry watering system can be suspended from a triangular truss system.

21 Claims, 4 Drawing Sheets

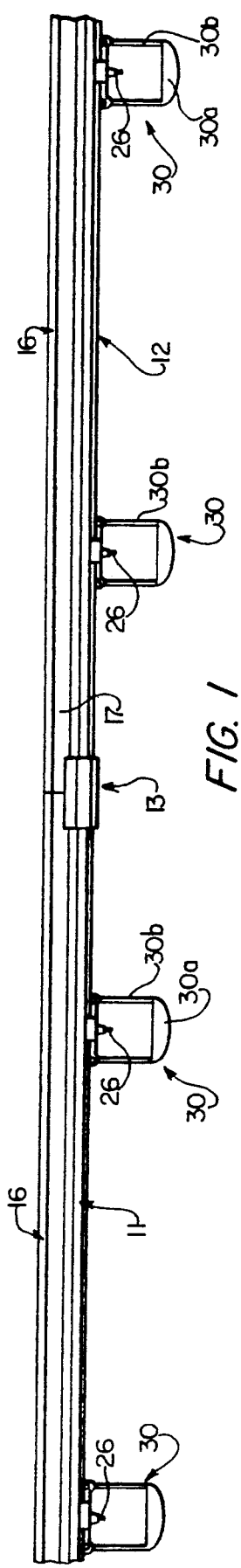
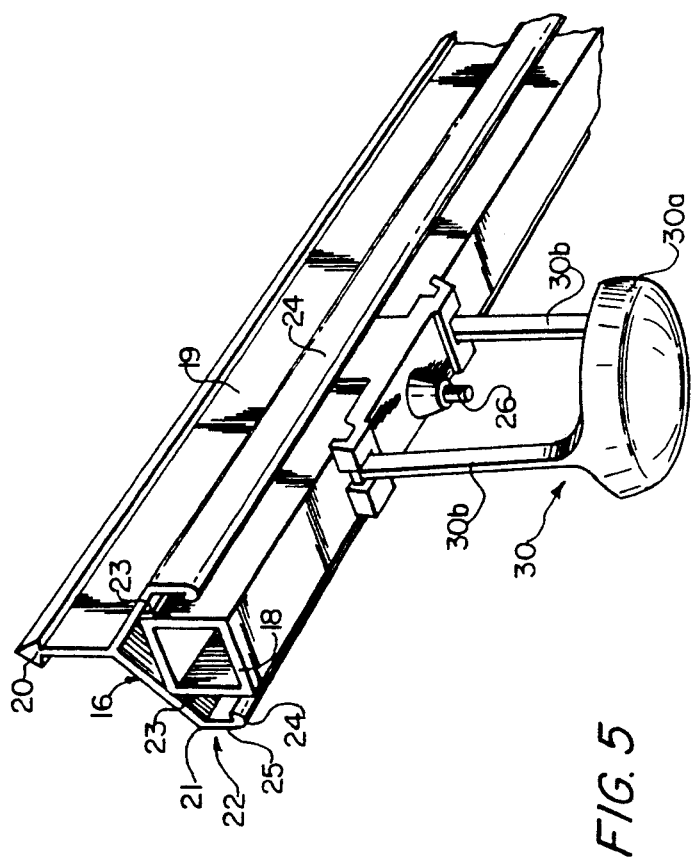

POULTRY WATERING SYSTEM

PRIOR RELATED APPLICATIONS

The present application is a continuation-in-part of my co-pending patent application entitled PLURAL DISCHARGE NIPPLE TYPE POULTRY WATERING SYSTEM HAVING AN ELONGATED SUPPORT BAR, HANGER, AND CUP AND KEEPER, filed Jun. 11, 1991, Ser. No. 07/713,334 now pending.

BACKGROUND OF THE INVENTION

1. Field of the Invention

The present application relates to poultry watering systems. More specifically, the invention relates to poultry watering systems having a plurality of water feeding nipples arranged in serial depending relation along a water supply tube or conduit, with an associated drip cup and a keeper coupling the cups and an overlying elongated support with a water supply tube.

2. Related Art

Heretofore, poultry watering systems for supplying drinking water to young chicks and the like have been of various structural arrangements, one of the popular types of which is the nipple type poultry water system having a plurality of valved watering nipples with actuating stems depending downwardly from an elongated, usually rectilinear, water supply tube or conduit and arranged serially along the length of the water supply tube at spaced intervals therealong. In some instances, long water supply pipe and nipple arrangements have been provided with additional support such as a support bar or rail to maintain the supply pipe aligned with a straight line, rectilinear horizontal or near-horizontal axis. In such cases, the water supply pipe is usually assembled to the support bar by a series of hanger straps having their lower portions encircling the water pipe and their upper portions secured about the support bar. Sometimes, a shaped plastic-type hanger structure has been provided to be assembled onto the water supply pipe and the support bar. Also, hanger cups have sometimes been provided, supported below each valved nipple and assembled to the water supply pipe only, but not the support bar, by a C-shaped formation extending about one side and lapping over and under vertically-aligned portions of the water supply pipe.

SUMMARY OF THE INVENTION

In accordance with the present invention, an improved plural nipple type poultry watering system is provided which combines a structural support, a water tube, plural nipples and catch cups. The watering system has valved nipples with downwardly extending activating stems arranged serially along a water supply pipe at spaced intervals therealong, together with a specially-shaped extruded support rail designed to surmount and enshroud the sides and top of the water supply pipe along the full length thereof. A dependent drip collecting cup is located below each valved nipple, and a keeper structure is associated with each nipple and its cup by interengagement of mating fastening lip formations on the keeper structure and the extruded rail for restraining the water supply pipe in enshrouded relation within the extruded support rail and for fixing the drip cups at appropriate locations along the supply pipe.

Further in accordance with the present invention is the provision of a plural nipple type watering system as described in the above paragraph wherein the extruded support rail and associated components form modules especially adaptable to being assembled in multiple modules arranged serially in longitudinal alignment to provide watering systems of various desired lengths.

Other objects, advantages, and capabilities of the present invention will become apparent from the accompanying drawings and the following detailed description of a preferred embodiment of the invention.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 1 is a side elevation of a plural nipple type poultry watering system embodying the present invention, shown as two modules assembled together along a horizontal axis;

FIG. 5 is a fragmentary perspective view of the water supply tube and extruded supporting rail of a module of the poultry watering system, viewed from an end and below;

DETAILED DESCRIPTION OF THE PREFERRED EMBODIMENTS

Figure 2:
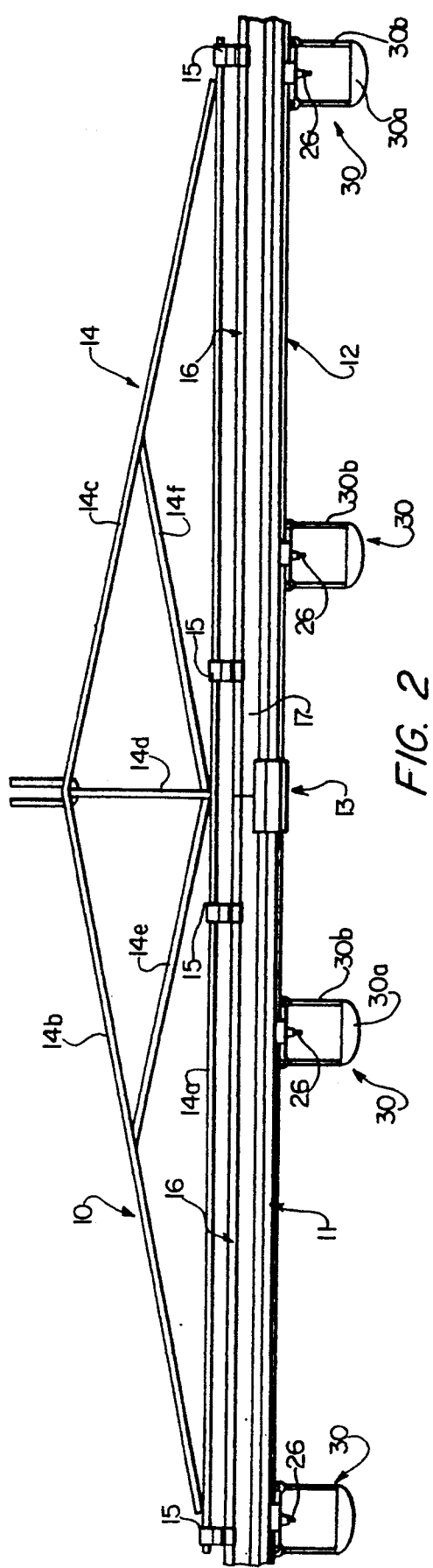
FIG. 2 is a side elevation of an alternate embodiment of the plural nipple type poultry watering system of the present invention, shown as two modules assembled together along a horizontal axis and suspended from a supporting truss system.
Figure 3:
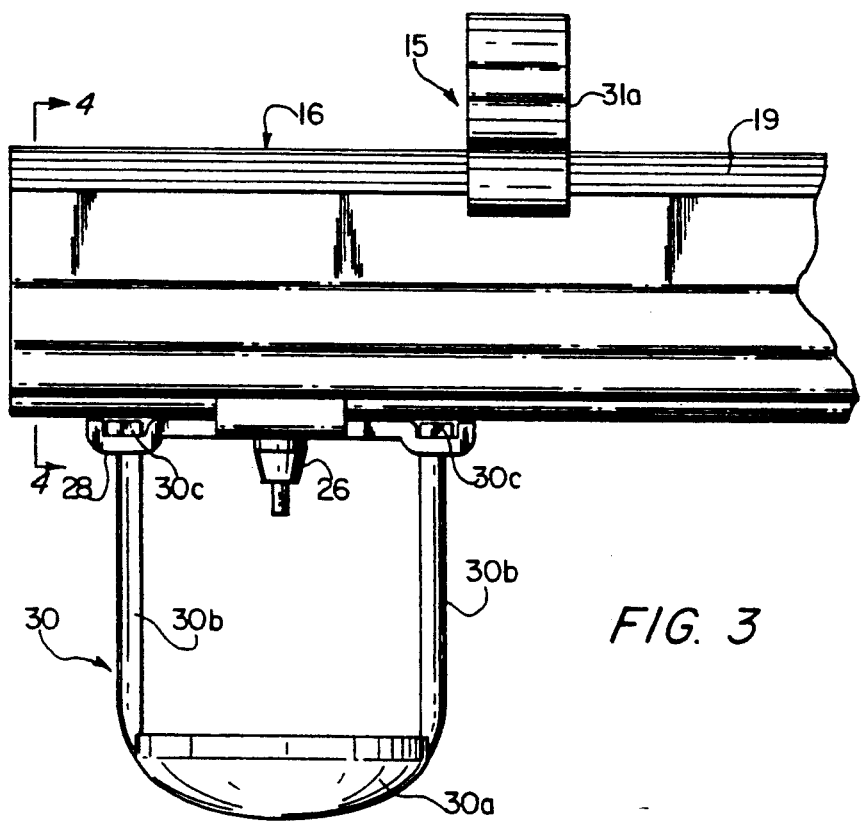
FIG. 3 is a side view of an end portion of the poultry watering system of FIG. 1, shown to enlarged scale.
Figure 4:
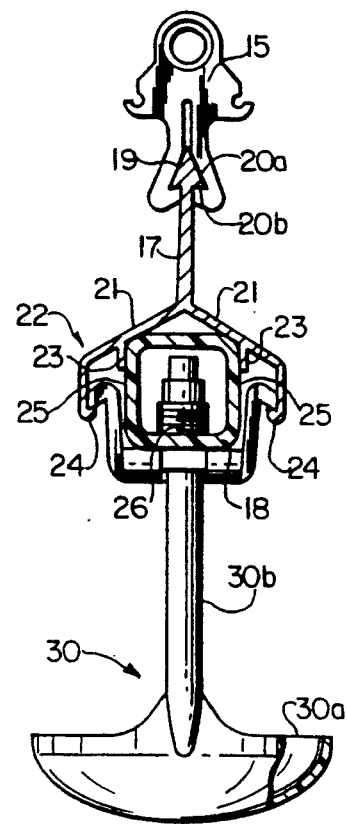
FIG. 4 is a vertical transverse section view thereof, taken along the line 4—4 of FIG. 3.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

FIG. 1 illustrates a first embodiment of a poultry watering system in accordance with the present invention, assembled as a pair of longitudinally-aligned modules comprises modules 11, 12 assembled together at their adjacent ends in longitudinal alignment by a connector sleeve 13.

FIG. 2 illustrates an alternate embodiment of the poultry watering system of the present invention, assembled as a pair of longitudinally-aligned modules 11, 12 suspended from a truss system indicated generally by the reference character 10. The truss system shown herein is of triangular configuration having a horizontal, elongated rod member 14a spanning the length of the plural module poultry watering assembly; a pair of outer, upwardly-inclined, converging rod members 14b, 14c; a center vertical rod member 14d; and a pair of interior bracing rod members 14e, 14f, extending upwardly from the longitudinal center of the truss in outwardly-diverging relation to join the rod members 14b, 14c.

In both embodiments, a pair of like, longitudinally-aligned plural nipple type poultry watering sections 16 each comprises an extruded support rail 17 with watering nipples and drip cups assembled therewith and enshrouding an elongated, square cross-section water supply tube 18 spanning the desired number of extruded support rail sections to be assembled together. In the second embodiment, poultry watering sections 16 are suspended below the truss system 14 by a plurality of longitudinally-spaced hanger members 15 having the special cross-sectional configuration shown in FIG. 7, as will be described in greater detail hereinafter.

The extruded support rails 17 include a vertical, upwardly-extending planar central web portion 19 terminating in an arrowhead-shaped upper edge formation 20 of generally triangular cross-section having exterior upwardly-inclined sides 20a converging at a sharp angle to a sharp edge and having inwardly-extending barb portions 20b whose lower faces converge inwardly at greater angles than the sides 20a forming return surfaces to the central web 19. The bottom of the web portion 19 near the vertical mid-region of the extrusion has joined thereto a pair of outwardly-diverging, downwardly-inclined flange portions 21 providing a lower flanged skirt formation 22 providing a downwardly-facing cavity for receiving the square cross-section water supply tube 18 in enshrouded relation therein embracing the top and opposite side of the tube 18.

The flanged skirt formation 22 includes laterally-spaced locator ribs 23 spaced apart the width of the water supply pipe 18 to receive and embrace the upper portion of the water supply pipe therebetween and center the pipe within the cavity defined by the skirt formation 22; and also includes a pair of upwardly- and inwardly-inclined fastener lips 24 at the lower edges of the vertical side portions 25 extending from the inclined flange portions 21.

The poultry watering nipple valve assemblies 26 are located at spaced intervals along the length of the water supply pipe and extruded support rail assembly and include a nipple body 26a having external threads 26b on the upper portion thereof to be assembled into threaded apertures (not shown) in the bottom wall of the pipe 18; and a rod-like activating stem 26c movably-mounted in the nipple body 26a and projecting downwardly through an opening sized and shaped to permit sufficient lateral rocking movement by the chick pushing against the protruding lowermost exposed stem portion to activate the internal valve member to allow water to pass from the supply pipe 18 through the stem-receiving opening into the chick's mouth. Flats are provided in the lower exposed portion of the nipple body 26a to permit a tool such as a wrench or the like to grip and turn the valved nipple body 26a to thread it into the openings therefor in the hollow wall of the water supply pipe 18.

Figure 8:
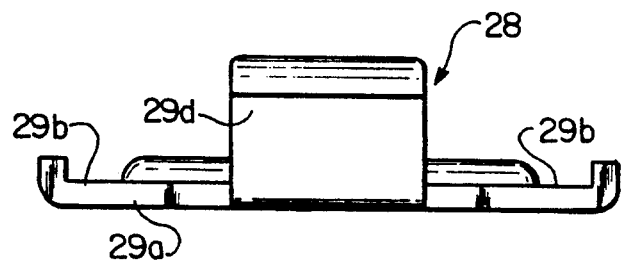
FIGS. 8 and 9 are side elevational and top plan views, respectively, of the keeper member.
Figure 9:
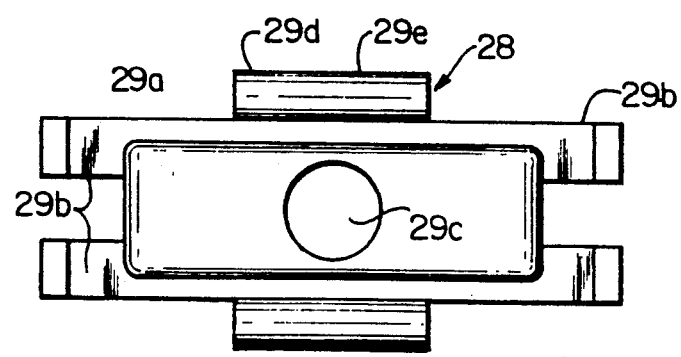

The keeper member is best shown in FIGS. 8 and 9, and is indicated by the reference character 28. The keeper member includes a lower plate portion 29a having transverse extending shallow channels 29b to receive and hold cross-head portions of T-shaped coupling formations at the tops of the legs of the drip cups, to be later described, and has a center aperture 29c for passage of the valved watering nipple assembly therethrough. A pair of side catch formations 29d project upwardly from the mid-region of the lower plate portion 29a to embrace opposite side wall portions of the water supply pipe 18; and have catch lips 29e at their upper edges with downwardly-facing inwardly- and upwardly-converging catch surfaces to interfit with the fastener lips 24 on the skirt sides of the extruded support rail 16 and interlock the associated keeper members 28 with the support rail 16 with the water supply pipe 18 held therebetween and supporting the valved nipple assemblies by their threaded intercouplings.

The drip cups are indicated at 30, and include a lower bowl or cup portion 30a to be located below each associated valved nipple assembly, with a pair of opposite, upwardly-extending legs 30b provided with T-shaped heads 30c at the tops of the legs 30b, the cross portions of the T-shaped heads interfitting in the shallow channels 29b of the keeper members 28.

Figure 6:
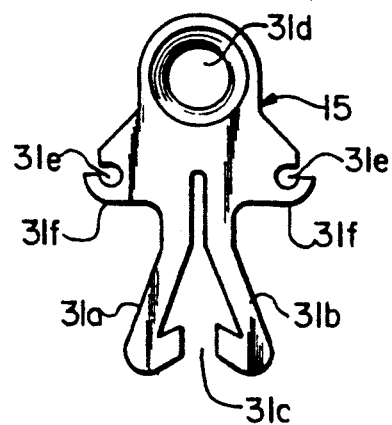
FIGS. 6 and 7 are transverse end and side views, respectively, of an alternate embodiment of one of the specially configured hanger straps for securing the uppermost end portion of the extruded support rail in suspended relation from and below a truss system.
Figure 7:
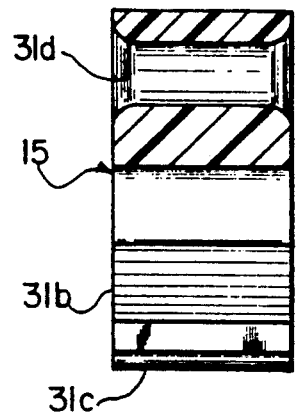

Referring now to FIGS. 6 and 7, the plastic hanger members 15 for use with truss 10 of the second embodiment include a lower portion formed of two downwardly- and outwardly-diverging, flexibly deformable legs 31a, 31b defining a downwardly-opening recess 31c of a cross-section closely conforming to that of the arrowhead-shaped upper portion 20 of the support rail 16, terminating at the lower ends of the legs 31a, 31b with catch lips 31d as shown to fit against and restrain the barb-like return faces 20b. As shown, laterally-opening recesses 31e in laterally-protruding arm formations 31f along the mid-region of the hanger member 31 are provided to receive and hold anti-perch wires along each side of the hangers over the length of the serially-connected rail sections and associated water supply pipe to discourage poultry from perching on the upper edge of the support rail 16. The uppermost portion of the hanger members 31 have a horizontal cylindrical bore or hole 31d to receive the lower horizontal rod member 14a of the truss system therethrough and assemble these components together; and, when the arrowhead formation of the extruded support rail 16 is interfitted in the recesses 31c, intercouple the truss system and support rail or rails 16 in assembled relation.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A plural nipple poultry watering system comprising:
   valved water discharging nipples;
   an elongated water supply pipe extending along a horizontal rectilinear path in use position, said supply pipe having a horizontal bottom, a horizontal bottom wall, opposed sides, a horizontal top, and a plurality of threaded apertures spaced serially longitudinally in said bottom wall to receive and mount said valved water discharging nipples respectively therein in downwardly-protruding relation;
   an elongated support rail member enshrouding said sides and top of said supply pipe and spanning the length thereof, said support rail having an upper edge portion and a vertical center web portion, said center web portion having a bottom;

a pair of oppositely-laterally-extending, downwardly-inclined flange portions located at said bottom of said center web portion, said flange portions providing a lower flanged skirt formation having vertical side-wall portions, said vertical side-wall portions having lower edges and said lower flanged skirt formation defining a downwardly-opening cavity for receiving said supply pipe therein;

a pair of laterally-spaced locator ribs depending from said inclined flange portions of said skirt formation for receiving and positioning said supply pipe in said cavity;

a keeper member located at each of said valved water discharging nipples, said keeper member having a bottom portion to engage said horizontal bottom of said supply pipe; and interengageable catch formations located on said keeper member and on said side wall portions of said support rail for interlocking said keeper member and said support rail together in assembled relation and for holding said supply pipe nested in said cavity.

2. The plural nipple poultry watering system as defined in claim 1, further comprising:

inwardly-projecting catch-type fastener lips located where said vertical side wall portions of said flanged skirt formation terminate at said lower edges;

a bottom plate forming said bottom portion of said keeper member, said bottom plate being elongated in the longitudinal direction of said supply pipe; and a pair of lateral side members including side catch formations to interfit with said catch-type fastener lips on said vertical side wall portions of said flanged skirt for holding said supply pipe nested within said cavity and supported by said support rail.

3. The plural nipple poultry watering system as defined in claim 1, further comprising:

drip cups positioned in depending relation below each respective valved water discharging nipple;

leg means located on said drip cups for supporting said drip cups, said leg means having upper portions; and interfitting means on said bottoms of said keeper members and said upper portions of said leg means for holding each of said leg means and each of said cups associated therewith in suspended relation below said support rail.

4. The plural nipple poultry watering system as defined in claim 3, wherein said leg means comprise:

a pair of legs extending vertically upwardly from a cup shaped portion thereof at opposite positions spaced along a path paralleling said longitudinal axis of said supply pipe, said legs having T-shaped heads, said T-shaped heads having cross-wise tops; and upwardly-facing, transverse, channel-shaped recesses located in said bottom portion of said keeper member to receive said cross-wise tops of said T-shaped heads and support said T-shaped heads against said bottom of said supply pipe.

5. The poultry watering system as defined in claim 1, further comprising:

a supporting framework disposed above said support rail and having a lower elongated rod member spanning the length of said support rail;

a plurality of keeper strap members arranged serially along the length of said support rail, each of said keeper strap members having an opening for receiving said rod member of said supporting framework therethrough and suspending said keeper strap members therefrom; and interfitting coupling formations located on said keeper strap members and said support rail, said coupling formations including rail gripping means for holding said support rail and said keeper strap members suspending said support rail below said supporting framework.

6. The plural nipple poultry watering system as defined in claim 5, wherein said keeper strap members each have opposite sides and a pair of laterally-opening wire-receiving recesses in protrusion formations along said opposite sides to receive and support elongated anti-perch wires therein above and coextensive longitudinally with said support rail.

7. The plural nipple poultry watering system as defined in claim 5, wherein said upper edge portion of said support rail has an upwardly-pointing arrowhead cross-sectional shape having a pointed upper end and providing a pair of oppositely laterally-extending barb portions below said pointed upper end of said arrowhead, and said keeper strap members being flexibly-deformable plastic having a downwardly-opening recess bounded laterally by flanking legs having downwardly-protruding catch lips to interfit under said barb portions of said arrowhead and to hold said support rail assembled with said hanger strap members.

8. The plural nipple poultry watering system as defined in claim 1, wherein said upper edge portion of said support rail has an upwardly-pointing arrowhead cross-sectional shape having a pointed upper end and providing a pair of oppositely laterally-extending barb portions below said pointed upper end of said arrowhead.

9. A plural nipple poultry watering system comprising:

valved water discharging nipples;

an elongated water supply pipe extending along a horizontal rectilinear path in use position, said supply pipe having a horizontal bottom, a horizontal bottom wall, opposed sides, a horizontal top, and a plurality of threaded apertures spaced serially longitudinally in said bottom wall to receive and mount said valved water discharging nipples respectively therein in downwardly-protruding relation;

an elongated support rail member enshrouding said sides and top of said supply pipe and spanning the length thereof, said support rail having an upper edge portion and a vertical center web portion, said center web portion having a bottom;

a pair of oppositely-laterally-extending, downwardly-inclined flange portions located at said bottom of said center web portion, said flange portions providing a lower flanged skirt formation having vertical side-wall portions, said vertical side-wall portions having lower edges and said lower flanged skirt formation defining a downwardly-opening cavity for receiving said supply pipe therein;

a pair of laterally-spaced locator ribs depending from said inclined flange portions of said skirt formation for receiving and positioning said supply pipe in said cavity;

a keeper member located at each of said valved water discharging nipples, said keeper member having a bottom portion to engage said horizontal bottom of said supply pipe;

interengageable catch formations located on said keeper member and on said side wall portions of said support rail for interlocking said keeper member and said support rail together in assembled relation and for holding said supply pipe nested in said cavity;

a truss system; and hanger members for suspending said support rail in depending relation from said truss system.

10. The plural nipple poultry watering system as defined in claim 9, wherein said upper edge portion of said support rail has an upwardly-pointing arrowhead cross-sectional shape having a pointed upper end and providing a pair of oppositely laterally-extending barb portions below said pointed upper end of said arrowhead, said hanger members having recesses for receiving and holding said arrowhead formations therein.

11. The plural nipple poultry watering system as defined in claim 9, wherein said truss system comprises:

a horizontal elongated rod member having a longitudinal center, said horizontal elongated rod member being longitudinally-attached to said support rail member of said poultry watering system;

a center vertical rod member extending upwardly from said longitudinal center of said horizontal elongated rod member;

a pair of first and second interior bracing rod members extending upwardly from said longitudinal center of said horizontal elongated rod member in an outwardly-diverging relation; and a pair of left and right outer upwardly-inclined converging rod members attached to said center vertical rod member by said left and right interior bracing rod members.

12. The plural nipple poultry watering system as defined in claim 9, further comprising:

inwardly-projecting catch-type fastener lips located where said vertical side wall portions of said flanged skirt formation terminate at said lower edges;

a bottom plate forming said bottom portion of said keeper member, said bottom plate being elongated in the longitudinal direction of said supply pipe; and a pair of lateral side members including side catch formations to interfit with said catch-type fastener lips on said vertical side wall portions of said flanged skirt for holding said supply pipe nested within said cavity and supported by said support rail.

13. The plural nipple poultry watering system as defined in claim 9, further comprising:

drip cups positioned in depending relation below each respective valved water discharging nipple;

leg means located on said drip cups for supporting said drip cups, said leg means having upper portions; and interfitting means on said bottoms of said keeper members and said upper portions of said leg means for holding each of said leg means and each of said cups associated therewith in suspended relation below said support rail.

14. A plural nipple poultry watering system comprising:

valved water discharging nipples;

an elongated water supply pipe having a bottom, an outer surface, and a plurality of threaded apertures spaced serially longitudinally in said bottom to receive and mount said valved water discharging nipples respectively therein in downwardly-protruding relation;

an elongated support rail enshrouding at least a portion of said outer surface of said supply pipe, said support rail having an upper edge portion and a vertical center web portion, said center web portion having a bottom;

a pair of oppositely-laterally-extending, downwardly-inclined flange portions located at said bottom of said center web portion, said flange portions defining a downwardly-opening cavity for receiving said supply pipe therein;

a keeper member located at each of said valved water discharging nipples, said keeper member having a bottom portion to engage said bottom of said supply pipe;

interengageable catch formations located on said keeper member and on said support rail for interlocking said keeper member and said support rail together in assembled relation and for holding said supply pipe within said cavity;

drip cups positioned in depending relation below each respective valved water discharging nipple;

leg means located on said drip cups for supporting said drip cups, said leg means having upper portions; and interfitting means on said bottom of said keeper member and said upper portions of said leg means for holding each of said leg means and each of said cups associating therewith in suspended relation below said support rail.

15. A plural nipple poultry watering system as defined in claim 14, wherein said support rail further includes laterally-spaced locator ribs.

16. The plural nipple poultry watering system as defined in claim 14, wherein said flange portions have lower edges, said keeper member including lateral side members extending from said bottom portion and said interengageable catch formations comprise:

inwardly-projecting catch-type fastener lips located at said lower edges of said flange portions; and a pair of side catch formations located on said lateral side members and interfitting with said catch-type fastener lips on said lower edges on said flange portions.

17. The plural nipple poultry watering system as defined in claim 14, wherein said leg means comprise:

a pair or legs extending vertically upwardly from a cup shaped portion thereof at opposite positions spaced along a path paralleling said longitudinal axis of said supply pipe, said legs having T-shaped heads, said T-shaped heads having cross-wise tops; and upwardly-facing transverse channel shaped recesses located in said bottom portion of said keeper member to receive said cross-wise tops of said T-shaped heads and support said T-shaped heads against said bottom of said supply pipe.

18. The poultry watering system as defined in claim 14, further comprising:

a supporting framework disposed above said support rail and having a lower elongated rod member spanning the length of said support rail;

a plurality of keeper strap members arranged serially along the length of said support rail, each of said keeper strap members having an opening for receiving said rod member of said supporting framework therethrough and suspending said keeper strap members therefrom; and interfitting coupling formations located on said keeper strap members and said support rail, said coupling formations including rail gripping means for holding said support rail and said keeper strap members suspending said support rail below said supporting framework.

19. The plural nipple poultry watering system as defined in claim 18, wherein said keeper strap members each have opposite sides and a pair of laterally-opening wire-receiving recesses in protrusion formations along said opposite sides to receive and support elongated anti-perch wires therein above and coextensive longitudinally with said support rail.

20. The plural nipple poultry watering system as defined in claim 18, wherein said upper edge portion of said support rail has an upwardly-pointing arrowhead cross-sectional shape having a pointed upper end and providing a pair of oppositely laterally-extending barb portions below said pointed upper end of said arrowhead, and said keeper strap members being flexibly-deformable plastic having a downwardly-opening recess bounded laterally by flanking legs having downwardly-protruding catch lips to interfit under said barb portions of said arrowhead and to hold said support rail assembled with said hanger strap members.

21. The plural nipple poultry watering system as defined in claim 14, wherein said upper edge portion of said support rail has an upwardly-pointing arrowhead cross-sectional shape having a pointed upper end and providing a pair of oppositely laterally-extending barb portions below said pointed upper end of said arrowhead.

* * * * *